United States Patent Office 3,495,674
Patented Feb. 17, 1970

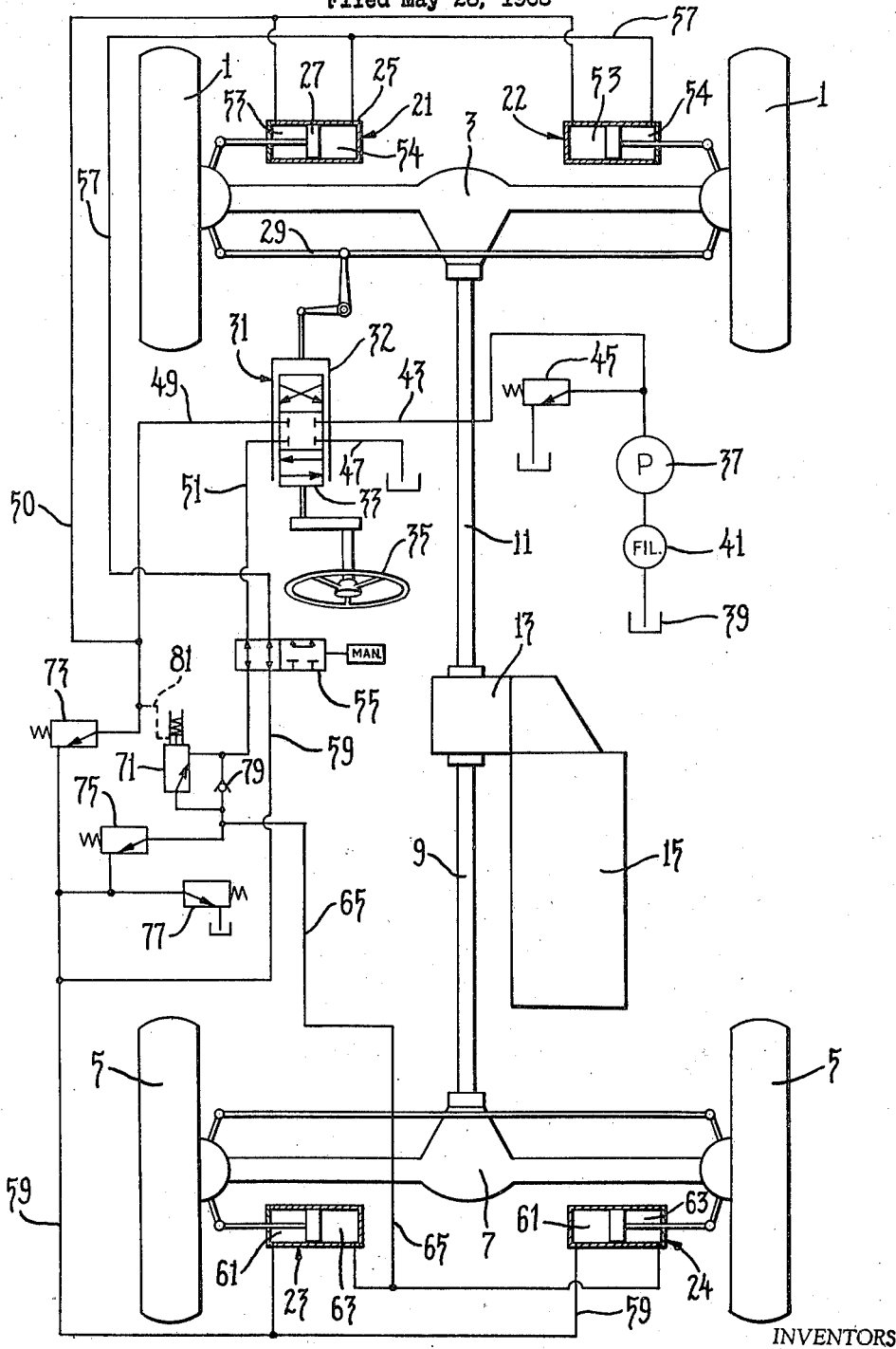

3,495,674
SYNCHRONIZED FOUR-WHEEL STEERING
SYSTEM
William J. Askins, Brecksville, and Roy E. Hauff, Stow, Ohio, assignors to Massey-Ferguson Inc., Des Moines, Iowa, a corporation of Maryland
Filed May 28, 1968, Ser. No. 732,715
Int. Cl. B62d 5/08
U.S. Cl. 180—79.2          8 Claims

ABSTRACT OF THE DISCLOSURE

A power steering system for a vehicle having either four-wheel steer or two-wheel steer. One set of wheels is controlled by a directional valve and mechanical follow-up system while the other set of wheels is controlled by a hydraulic slave system utilizing oil under pressure forced out of the follow-up system cylinders to actuate cylinders for the second set of wheels. A relief valve system is provided to balance pressures in the front and rear wheel cylinders and provide a resisting force to movement of the slave cylinders by external loads. The relief valve system acts to lower the resistance force when the slave wheels are being moved by the power steering system and also provides for synchronizing the front and rear wheels after two-wheel operation and for purging the system of air and permitting thermal expansion of oil trapped in the system.

The invention relates to a four-wheel steering control system and more particularly to a four-wheel steering system that will selectively and automatically synchronize the front and back wheels when four-wheel steering is desired.

One form of four-wheel steering utilizes four hydraulic cylinders, one for each of the four steering wheels. During operation, when only two wheels are being steered, the other two wheels are locked in a forward position by some suitable hydraulic or mechanical block. Where all four wheels are being steered, there is a hydraulic linkage between the front and rear wheels which acts to couple the front and rear wheel cylinders in series. If the front wheels are mechanically connected by a follow-up system to the steering directional valve, then the rear wheels act as slave wheels which follow the front wheels in their turning movement.

Since the rear wheels are not mechanically connected to the directional control valve and the steering wheel, it is possible for external loads on the rear wheels to cause them to move ahead of the front wheels. In order to prevent such movement, it is desirable therefore to provide a counter-balance or hydraulic load on the movement of the rear wheels with such counter-balance or load to be greater than that which the external forces that the wheel will normally encounter. If this hydraulic load were present during normal steering operations, i.e., when the rear wheels are being turned in one direction or the other by the power steering system, the load on the steering system would be quite high. Furthermore, if this hydraulic load utilized a relief valve, continual operation of the wheels would cause heating of the oil as well as excessive use of power. It therefore would be desirable to have a counter-balance force or artificial hydraulic load on the wheels only during the time that it is not desired to turn the wheel.

It is therefore an object of this invention to provide a four-wheel steering system having a first set of wheels controlled by a mechanical follow-up power steering system and a second set of wheels which are slave controlled from the first set, counter-balance or external load providing means being provided for the second set of wheels which prevent their being turned by external forces and which is inoperative during normal steering operation.

Other objects and advantages of the invention will be readily apparent from the accompanying drawings and description and the essential features will be set forth in the appended claims. In the drawings:

The figure shows a schematic and diagrammatic view of the invention applied to a four-wheel vehicle.

In the illustrated example shown, the vehicle has a pair of front wheels 1 carried by a drive axle 3 and a pair of rear wheels 5 carried by a drive axle 7. The rear wheels are driven by a rear drive shaft 9 and the front wheels by a front drive shaft 11, the two drive shafts being driven by a transfer mechanism 13 in turn driven by an engine 15.

The front wheels 1 are turned by a pair of cylinders 21 and 22. A single cylinder could be used to turn both wheels and since the cylinders are identical, only one of them will be described. The cylinder includes a constant volume device 25 having a piston 27 therein, the piston being connected through linkage to the wheel, or wheels, to turn the same. A tie rod 29 connects the two wheels 1, while a mechanical follow-up linkage is connected from the tie rod 29 to a directional valve generally indicated 31.

The external part of the valve 31 is identified 32 while the axially movable internal spool is identified 33. The valve is a three-position valve that is moved by a steering wheel 35. A positive displacement pump 37 is driven to pump suitable fluid such as oil from a reservoir 39, through a filter 41, into a pressure passage 43 leading to the valve 31. A relief valve 45 serves to protect the pump and limit the pressure in the pump and line 43.

The valve 31, in addition to being connected to line 43, is connected to a drain passage 47 leading to an oil sump. A pair of output ports are connected to passages 49 and 51, respectively. The various positions of the inner valve member 33 with respect to the outer valve member 32, act to connect the passages 43 and 47 to the passages 49 and 51 in the manner indicated in the upper and lower schematic portions of the valve. The intermediate position of the valve serves to block flow to both the passages 49 and 51 and represents a non-turning steering position.

The piston 27 in the front wheel cylinder 21 divides the member 25 into chambers 53 and 54. The chamber 54 of cylinder 21, and the corresponding chamber in cylinder 22 are connected by a passage 57 to a steering mode selector valve 55. This valve 55 is a two-position valve which either directly connects the line 57 with a line 51 or connects these two lines to further passages in hydraulic connection with the rear wheel cylinders as will be described below.

With the steering mode selector valve 55 in the position shown in the figure, line 57 is connected to a rear cylinder passage 59 that in turn is connected to the chambers 61 of the rear cylinders 23 and 24. The chambers 63 on the other side of the pistons of the rear cylinders are connected to the steering valve 31 via a locking and synchronization valve system described below. Oil from chambers 63 is carried along line 65 through this valve system to the line 51 leading to or from the steering directional control valve 31. The synchronizing and locking valve system includes four relief valves 71, 73, 75 and 77. A check valve 79 is connected in a by-passing manner to the relief valve 71 and allows free flow of oil from passage 65, but requires oil passng in the reverse direction to pass through the relief valve 71.

In the example shown, relief valves 73 and 75 are set to relieve pressure at 1400 p.s.i., while relief valve 77 is set to relieve pressure at 1000 p.s.i. Valve 71 is a two-pressure relief valve that is pilot controlled and has one relief pressure operation at approximately 1000 p.s.i. and a second relief presure operation at approximately 100 p.s..i The relief valve 71 normally relieves pressure ot the 1000 p.s.i. level, but whenever pressure is present in a line 50, a passage 81 connects the line 50 with the relief valve 71 and the pressure therein tends to overcome the relief valve spring force so that the valve will function at a lower pressure such as 100 p.s.i.

FOUR-WHEEL RIGHT TURN OPERATION

In order to make a right turn, the steering well 35 is moved so that valve 33 is conditioned with the lower schematic block portion in operative position. At this time, pressure from the pump 37 in line 43 is directly connected to passage 49 and 50 wherein it acts in chambers 53 on pistons 27 to turn the wheels to their right turn position. Oil in chambers 54 is then forced out through passage 57 and through steering mode selector valve 55 passes into line 59 and into chambers 61. Pressure in chamber 61 acts to move the piston in cylinders 23 and 24 to the right causing the wheels 5 to turn to a position aiding the right turn of the vehicle.

Fluid in the chamber 63 on the right side of the piston, in cylinders 23 and 24, must pass out through line 65. The check valve 79 prevents free flow to valve 55. The relief valve 71, at this time, is conditioned for its 100 p.s.i. operation, since there is a positive pump pressure in passage 50. Oil in cylinders 25 then passes over relief valve 71 at the relatively low 100 p.s.i. back pressure and flows through the selector valve 55, passage 51 and through the directional valve 31 to the sump.

During this right-hand turn, the rear cylinders 23 and 24 are slave cylinders because there is no mechanical connection to the front wheels or steering valve 31. The counter-balance, or relief valve 71, provides for sufficient back pressure during the right-hand turn to maintain a relative solid or stiff system.

FOUR WHEEL LEFT-HAND TURN OPERATION

To make a left-hand turn, the steering wheel 35 is actuated to move the valve 31 to a position where the upper schematic block is in operative position. At this time pressure from the pump 37 in line 43 is connected to line 51. Pressure in line 51 then freely passes through check valve 79 into line 65 and from there into the chamber 63 of cylinders 23 and 24. Pressure in cylinder 23 acts to move the piston therein to the left to move the rear wheels to a left turn position. Oil in chamber 61 is forced into line 59 and passes through valve 55 into line 57 and from there into the right-hand chambers 54 in cylinders 21 and 22. Oil in chambers 53 is forced out by movement of the piston to the left and passes into line 50, line 49 and through valve 31, into the sump.

During a left-hand turn, the rear wheels are the main primary actuated wheels and the front wheels become the secondary actuated wheels. Because the front, or secondary actuated wheels during a left turn are mechanically connected to the steering valve assembly, the front and rear wheels move in unison without the requirement of a back pressure or counter-balance such as that provided by valve 71 and during a right turn.

TWO-WHEEL STEER RIGHT TURN

To operate the vehicle with front wheel steering only, the steering model valve 55 is moved to its alternative two-wheel steer position wherein passages 57 and 51 are directly connected together and the rear system is isolated. During a right turn with the front wheel steer only, oil supplied from the pump 37 passes through the steering valve 33 into line 49, line 50 and chamber 53. Oil being forced from the cylinders from chamber 54 passes into line 57 and through the valve 55 into passages 51 and through the steering valve 31 to the sump.

Normally, the valve 55 is changed by the vehicle operator from a four-wheel to a two-wheel steer condition only when the rear wheels 5 are in their straight-ahead position. With the valve 55 in its two-wheel condition, the oil in cylinder 23 is prevented from escaping from either chamber 61 or chamber 63 by means of the relief valve system and the blocked ports of valve 55. Thus, oil in chamber 61 can only escape the system through the relief valve 77 which as mentioned above is set for 1000 p.s.i., and oil in the chamber 63 can only escape through the relief valve 75 which is normally set at 1400 p.s.i. The flow can then exhaust therefrom only through the relief valve 77. In the event that there is a right turn, there is oil pressure in line 50 and thus the valve 71 is conditioned for its 100 p.s.i. operation. At this time during two-wheel steer, the 100 p.s.i. control has no effect on the rear steering, since the steering mode valve 55 prevents passage of oil out of line 65 and at least 1400 p.s.i pressure is required to open relief valve 75 before oil can exhaust from chamber 63 through valve 75 and valve 77. This requirement that the pressure in chambers 61 or 63 exceed 1000 p.s.i. before the piston can move, insures that the wheels will remain in the hydraulically locked-up straight-ahead position.

TWO-WHEEL LEFT TURN

To make a left turn in a two-wheel steer condition, the valve 31 is conditioned to allow pressure from pump 37 to pass into line 51 and through selector valve 55 into passage 57 and to the left-hand chambers 54 to cause the piston 27 to move to the left, causing the wheels to turn to the left turn position. Oil in chambers 53 is permitted to escape through line 50 and 49 from which it passes through the steering valve 31 into the sump. During all two-wheel steer conditions, the mechanical connection between the wheels and the steering valve 31 insures that the wheels will maintain a position corresponding to the position of the valve as set by the steering wheel 35.

After operation in a two-wheel steer and it is desired to return to a four-wheel steer condition, the steering mode selector valve 55 is again returned to the position shown in the figure whence the rear hydraulic system is connected to the front hydraulic system. In order to synchronize the front and rear wheels, the steering wheel 35 is then turned either fully to the right or fully to the left until the wheels 1 reach mechanical stop (not shown). Assuming a right-hand turn, pressure from the pump passes through passage 49 and 50 into the chamber 53 to move the pistons 27 to the right. Oil in chamber 54 exhausts through passage 57, the valve 55, line 59 and into chamber 61, where it acts on the piston to move the rear wheels to their right turn position. If there is insufficient oil in the closed loop system this includes chamber 54, line 57, line 59 and chamber 61, as for example, if the wheels 1 start the right turn from a full left turn position, the valve 73 acts as a makeup valve. Thus, when the pressure in line 50 and chamber 53 increases when the wheel 1 reaches the end of its turn and the pressure builds up in chamber 53, this pressure, when it reaches 1400 p.s.i. will pass through the relief valve 73 into a line 59 and cause rear cylinders to move the rear wheels to the same extreme turn position as the front wheels.

On the other hand, if the wheels 1 are on the extreme right-hand position when beginning a left-hand turn, excessive oil in the loop system including chamber 54, line 57, 59 and chamber 61 can exhaust through the relief valve of 77. During a left turn, pressure from the pump 37 acting in line 51 will act through the check valve 79 to cause the rear wheels to move to the left until they reach their stop. At this time pressure in chamber 63 and line 65 will build-up until it is relieved by relief valve 75 into the line 59. The pressure in line 59 cannot exceed the 1000 p.s.i. set by valve 77. The valve 77 further acts to purge the rear wheel system of air whenever oil is entering it through the relief valve 73 or through the relief valve 75. The relief valve 77 also allows for thermal expansion of oil in the system during a hydraulically locked position.

It will be understood that while we have shown a vehicle having a front wheel steered only and four-wheel steer, the invention will be equally applicable to a vehicle wherein the two-wheel operation is through the rear wheels. Furthermore, while the embodiment illustrated has the front and rear wheels turned in opposite directions, the invention will be applicable to a vehicle wherein the wheels turn in the same direction.

It will be seen that we have provided a two-wheel and four-wheel system wherein the front and rear wheels can be operated in unison without the danger of external loads on the wheels causing them to move out of synchronism. The system further provides that when switching from a two-wheel to a four-wheel system, the front and rear wheels can easily be synchronized so as to cause the vehicle to turn in the right or left direction as desired.

What is claimed is:

1. A power steering system for a vehicle having first and second power steered wheels, a first double acting cylinder for turning the first wheel, a second double acting cylinder for turning the second wheel, a source of fluid under pressure, a reservoir, fluid transfer means interconnecting one side of each cylinder to effect turning of one wheel in response to turning of the other wheel, directional valve means for selectively alternately connecting the other side of the first cylinder with the source to turn its wheel and connecting the other side of the second cylinder to the reservoir and vice versa, relief valve means controlling the flow of oil out of said other side of the second cylinder for providing a relatively high resisting force to movement of the second wheel cylinder and wheel, a one-way valve in parallel with said relief valve allowing free flow of fluid under pressure from said directional valve to said other side of the second cylinder, and follow-up means connecting said directional valve means with said first cylinder.

2. A power steering system for a vehicle having first and second power steered wheels, a first double acting cylinder for turning the first wheel, a second double acting cylinder for turning the second wheel, a source of fluid under pressure, a reservoir, fluid transfer means interconnecting one side of each cylinder to effect turning of one wheel in response to turning of the other wheel, directional valve means for selectively alternately connecting the other side of the first cylinder with the source to turn its wheel and connecting the other side of the second cylinder to the reservoir and vice versa, means controlling the flow of oil out of said other side of the second cylinder and connected to the directional valve means for providing a relatively low resisting force to movement of the second cylinder and wheel when fluid under pressure is being directed to the first cylinder by said directional valve means to turn the first wheel and for providing a relatively high resisting force to movement of the second wheel cylinder and wheel when said directional valve means is not directing fluid to the other side of the first wheel cylinder, and follow-up means connecting said directional valve means with said first cylinder.

3. The power steering system of claim 2 wherein a one-way valve is provided between said directional valve and said other side of the second cylinder.

4. The power steering system of claim 3 wherein said means controlling the flow of oil out of said other side of the second cylinder includes a pressure relief valve normally operative to relieve pressure above a predetermined high pressure which is above the normal maximum externally created pressure in said other side of the second cylinder caused by external loads on the second wheel, said pressure relief valve responsive to fluid under pressure from said directional valve means to lower the relief pressure to relatively low pressure below said normal maximum externally created pressure.

5. The power steering system of claim 4 wherein a by-pass check valve is provided to allow flow of fluid under pressure into said other side of the second cylinder and prevent flow out of said other side of the second cylinder except through said relief valve.

6. The power steering system of claim 5 wherein a selector valve is provided to selectively disconnect the one side of the first cylinder from said one side of the second cylinder, disconnect the other side of the second cylinder from said directional valve and simultaneously connect said one side of the first cylinder to said directional valve whereby said second cylinder and second wheel are no longer controlled by said directional valve means.

7. The power steering system of claim 6 wherein a second relief valve having a predetermined high pressure setting is connected between the other side of the first wheel cylinder and said fluid transfer means for supplying fluid to said fluid transfer means and the one side of the second cylinder to cause it to move the second wheel to one extreme position when said first cylinder has moved the first wheel to a corresponding extreme position wherein the pressure on said other side of the first cylinder builds up over the predetermined high pressure setitng of the second relief valve.

8. The power steering system of claim 5 wherein a third pressure relief valve is provided to allow air or excess fluid to flow out of said fluid transfer means when the pressure in said fluid transfer means exceeds a predetermined pressure that is less than said predetermined high pressure setting of the second relief valve.

References Cited
UNITED STATES PATENTS

| | | | |
|---|---|---|---|
| 3,185,245 | 5/1965 | Hoyt | 180—79.2 |
| 3,202,238 | 8/1965 | Strader | 180—79.2 |

FOREIGN PATENTS

| | | |
|---|---|---|
| 479,508 | 12/1951 | Canada. |

BENJAMIN HERSH, Primary Examiner

JOHN A. PEKAR, Assistant Examiner

U.S. Cl. X.R.

60—52